US012176642B2

(12) United States Patent
Sane et al.

(10) Patent No.: US 12,176,642 B2
(45) Date of Patent: Dec. 24, 2024

(54) HIGH SPEED INTERFACE

(71) Applicant: Microsoft Technology Licensing, LLC, Redmond, WA (US)

(72) Inventors: Deepali Anand Sane, Redmond, WA (US); Stephen Douglas Hawn, Sammamish, WA (US); Charles Samuel Saldana Schulman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 651 days.

(21) Appl. No.: 17/453,157

(22) Filed: Nov. 1, 2021

(65) Prior Publication Data

US 2023/0138758 A1 May 4, 2023

(51) Int. Cl.

| | |
|---|---|
| ***H01R 12/00*** | (2006.01) |
| ***H01R 12/59*** | (2011.01) |
| ***H01R 12/67*** | (2011.01) |
| ***H01R 12/79*** | (2011.01) |

(52) U.S. Cl.
CPC ........... *H01R 12/79* (2013.01); *H01R 12/592* (2013.01); *H01R 12/675* (2013.01)

(58) Field of Classification Search
CPC ..... H01R 12/79; H01R 12/592; H01R 12/675
See application file for complete search history.

(56) References Cited

U.S. PATENT DOCUMENTS

| | | | | |
|---|---|---|---|---|
| 2006/0216969 A1* | 9/2006 | Bright | H01R 13/6477 439/79 |
| 2007/0082555 A1* | 4/2007 | Tanaka | H01R 31/06 439/660 |
| 2017/0093059 A1* | 3/2017 | Chen | H05K 1/147 |

* cited by examiner

*Primary Examiner* — Phuong Chi Thi Nguyen
(74) *Attorney, Agent, or Firm* — Holzer Patel Drennan

(57) ABSTRACT

A flat flexible cable (FFC) is configured to facilitate high-speed communications, such as USB Superspeed 3.0 signals, between processors. The FFC includes at least two differential signal pairs arranged directly adjacent to one another on opposite sides of an isolation gap consisting of non-conductive material. The size of the isolation gap may be tailored in proportion to the frequency of signals supported by the FFC.

20 Claims, 8 Drawing Sheets

HIGH SPEED INTERFACE

BACKGROUND

Flex cables are often used in electronic devices to connect different processing components, such as a between a motherboard processor and a daughter card microprocessor. Due to space constraints and the highly compact nature of modern electronics, there exist some design configurations in which it may be desirable to bend a flex cable at an angle in order to facilitate a coupling between distally-located processing components. In certain flex cables, such as those designed to transmit USB 3.0 SuperSpeed signals, inflection points (bends) in the cable have the effect of reflecting noise and degrading the quality of transmitted signals.

SUMMARY

Figure 1:
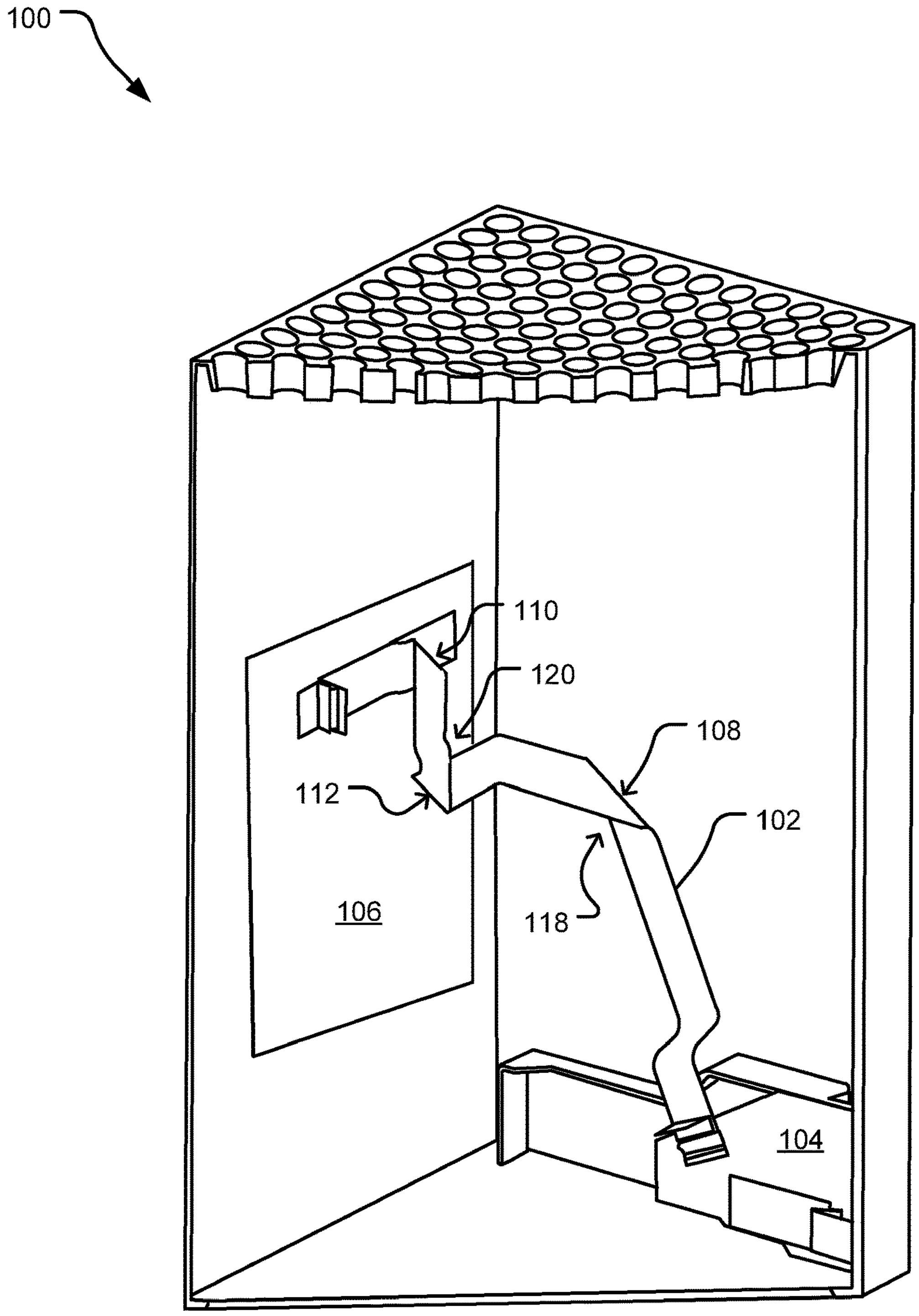
FIG. 1 illustrates an example processing device including a flat flexible cable (FFC) that is used to transmit high-speed data signals between a first processing component and a second processing component along a non-linear path.

The herein disclosed technology includes a flat flexible cable (FFC) that facilitates transmission and receipt of high-speed communications. The FFC includes at least two differential signal pairs arranged directly adjacent to one another on opposite sides of an isolation gap, and the isolation gap consists of non-conductive isolation material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Flat flexible cables (FFCs) are commonly used inside of electronic devices to couple together different processing components. For example, FFCs are often used to facilitate communications between a motherboard to a daughtercard. As signal frequencies increase with higher data speeds, noise typically increases proportionally. Traditional FFC designs are susceptible to high levels of noise. For this reason, FFCs are typically short (e.g., a few inches or less) and used to support low-frequency/low-speed transmissions.

The herein disclosed technology provides an FFC design that less susceptible to noise and therefore better suited to support high-frequency/high-speed signals. Although the herein disclosed technology may be implemented in various types of FFCs designed for different communication protocols, particular emphasis is given herein to FFCs utilized for exchanging high-speed data, such as via USB 3.0. Personal computing devices supporting USB 3.0 communications typically include a USB board supporting a USB controller. In such devices, the USB board performs actions such as monitoring for the detection of new device(s) coupled to external USB ports, power management to external USB ports, and data flow management between the motherboard and devices plugged into USB ports of the device.

The examples disclosed herein pertain to certain use cases in which current industry-standard FFCs are especially prone to performance degradation. In these use cases, the FFC is folded back on itself about an inflection point (e.g., to create a turn in the cable path), effectively stacking different portions of the FFC on top of one another or in close proximity. In existing FFC designs, these "folded" configurations are especially problematic due to cross-talk between signal traces that is reflected in the fold regions of the cable. The herein disclosed FFC design reduces signal noise enough that FFC folding can be achieved without a loss in signal quality, thereby adapting FFCs for use in a variety of compact and geometrically complex arrangements previously deemed incompatible with FFC technology.

The herein disclosed FFC design and implementation techniques significantly reduce signal degradation associated with high-speed signals across longer FFCs and/or across FFCs that are folded at one or more inflection points (e.g., to vertically stack different portions of the cable in one or more places).

FIG. 1 illustrates an example processing device 100 including a flat flexible cable (FFC) 102 that is used to transmit high-speed data signals bilaterally between a first processing component 104 and a second processing component 106 along a non-linear cable path. The processing device 100 may be any of a variety of different types of compute devices including for example, a desktop computer, laptop computer, tablet, gaming console, set-top box, etc. In one implementation, the first processing component 106 is a motherboard including one or more CPUs or GPUs and the second processing component 106 is a daughterboard including one or more microprocessors.

Although signal quality typically degrades in proportion to cable length (due to increased path losses), there exist product designs where it is desirable to locate processing components that are to communicate with one another processing at a non-trivial distance away from one another, such as at opposite sides of the device and/or diagonally relative to one another within the device. In such scenarios, connections between the processing components (e.g., the first processing component 104 and the second processing component 106) may be realized by bending the FFC 102 in one or more places to form a non-linear path and thereby accommodate connections between distally-located processing components. For example, the FFC 102 includes multiple inflection points 108, 110, 112 where the FFC is folded back on itself at an inflection point. Each of the inflection points 108, 110, 112 separates directly adjacent first and second portions of the FFC 102 that are then stacked on top of one another in the region proximal the fold, as shown.

One consequence of including bends to fold the FFC back on itself (as shown at 108, 110, 112) is signal degradation. This is particularly true in designs that include ground traces extending along the length of the cable—a feature that is present in all current industry-standard FFCs as well as a variety of other types of cables. The current industry-standard cable for USB 3.0 includes multiple differential signal pairs, and each differential signal pair is isolated from its immediately adjacent differential pairs by a pair of ground traces that extend along the full length of the FFC 102. This design, shown and discussed further with respect to FIG. 2A below, is acceptable in certain traditional implementations where the cable is straight (with no bends) and the length of the cable is relatively short to mitigate the magnitude of impact of loss and impedance mismatch between transmitted and received signals.

However, when the FFC 102 is long and/or the signal frequency becomes higher, noise becomes more problematic. In such cases, cross-talk from the differential signal pairs causes noise to accumulate on the ground traces, and the ground traces act as transmission lines that propagate the noise along the length of the FFC 102. In implementations where the FFC 102 is folded back on itself in one or more places, as shown, noise generated as a result of cross-talk between the differential pairs may also be reflected along the ground traces by folds in the cable (e.g., by the inflection points 108, 110, 112), further degrading signal quality.

In FIG. 1, the foregoing issues are prevented or mitigated by the FFC 102, which includes features that are modified in relation to the above-described industry-standard FFC. In this proposed FFC design, the differential signal pairs are each separated from one another by a gap consisting of insulating material and no conductive material. In one implementation, the gap is selectively tailored in size in proportion to the frequency of signals that the FFC is designed to support. Since there is no conductive material and there is sufficient spacing between the differential signal pairs, cross-talk noise between the differential signal pairs is not significant.

Further, in some implementations, signal noise that is due to reflection at cable inflection point(s) (folds) is further mitigated by reducing the number of inflection points in the FFC 102 and/or the tightness of the angle created by the fold at a given inflection point. For example, a select non-linear path design for the FFC 102 may utilize one or more folds that create an obtuse angle 118 between portions of the FFC on either side of the fold (e.g., a separation angle greater than 90 degrees) in lieu of folds that create right angles (e.g., a right angle 120). This increase in the angle of the fold, effectively making the fold "less narrow," reduces noise that is due to signal reflection.

Due to the above-described features (discussed further below), the FFC 102 provides higher signal quality as industry standard cables designed for the same purpose, making the cable well adapted to use cases where the FFC is bent to form one or more inflection points.

Figure 2:
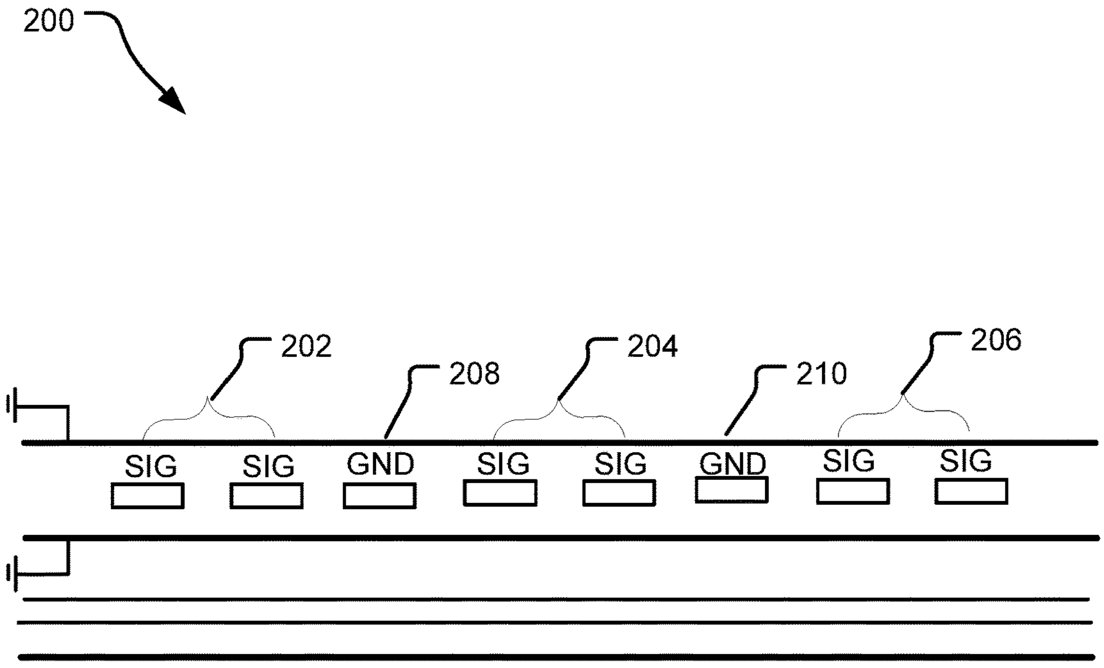
FIG. 2 illustrates an example FFC that is consistent with industry-standard features.

FIG. 2 illustrates an example high-speed cable 200 with industry-standard features. Notably, the high-speed cable 200 includes three sets of traces 202, 204, and 206 that each carry a differential signal pair. Each differential signal pair is isolated from the immediately adjacent differential signal pair(s) by a ground trace 208 or 210. This layout is common in FCCs, FPCs, PCBs, and other cables used to transmit high-speed differential signals. In contrast to the FPCs and PCBs, however, traditional FFCs cannot tie the inner ground conductors to ground planes along their length, which causes the ground conductors to act as transmission lines for noise—particularly at high signal frequencies.

When the illustrated high-speed cable layout (e.g., ground-signal-signal-ground) is implemented in an FFC (as opposed to a FPC or PCB), the ground traces 208, 210 act as transmission lines for this cross-talk (noise) between the differential signal pairs. The effect of this cross-talk increases in proportion to cable length and signal frequency. In implementations where such an FFC is folded, this cross-talk transmitted along the ground traces 208, 210 and is reflected at the inflection points (folds) in the cable 200, further degrading the quality of signals received along the differential signal pair traces.

Figure 3:
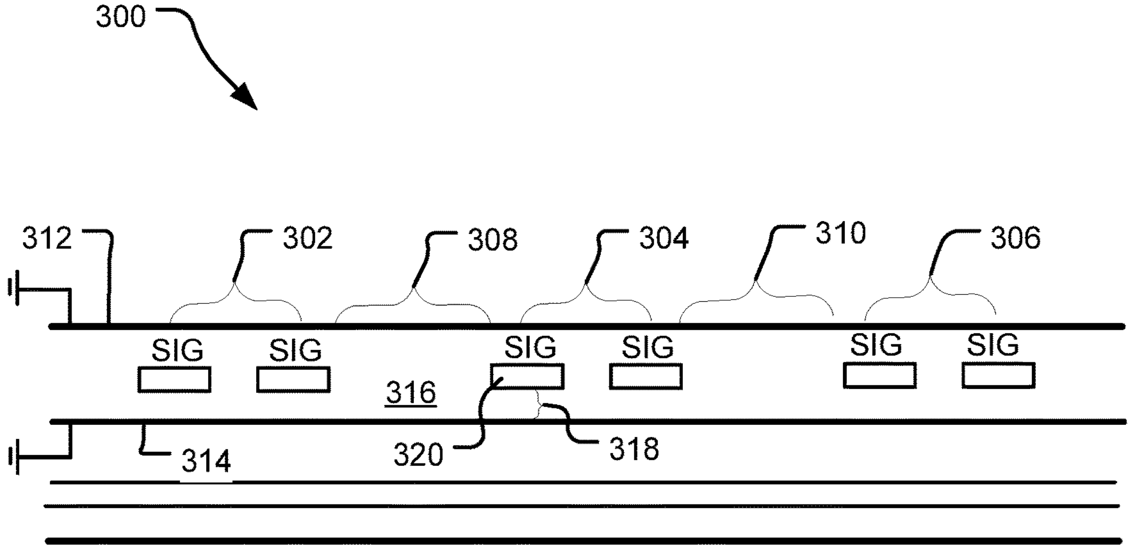
FIG. 3 illustrates an example FFC including features that yield improved signal quality as compared to an industry-standard FFCs.

FIG. 3 illustrates an example FFC 300 including features that improve signal quality as compared to FFCs that integrate high-speed cable features (e.g., the ground-signal-signal-ground layout) such as those shown in FIG. 2. In one implementation, the FFC 300 is configured to transmit USB 3.0 SuperSpeed signals. Like the FFC of FIG. 2, the FFC 300 includes three pairs of traces 302, 304, and 306 that each carry a differential signal pair. For example, the pairs of signal traces 302 and 304 may be used to transmit and receive high-speed (3.0) signals, while the pair 306 is used to support low-speed communications (e.g., USB 2.0). Each trace within the pairs of signal traces 302, 304, and 306 is encased within and surrounded by an insulating material 316 which is, in turn, encased by a ground plane. Notably, the cross-sectional view of FIG. 3 illustrates ground plane portions 312 and 314 on opposing sides of the pairs of traces 302, 304, 306. In one implementation, the ground plane portions 312, 314 are opposing sides of a continuous ground plane, such as a foil sheet or other conductive coating, encasing the portion of the cable including the pairs of traces 302, 304, 306.

In FIG. 3, the pairs of the traces 302, 304, and 306 are each separated from one another by an isolation gap (e.g., an isolation gap 308) that is filled with exclusively with the insulating material 316. That is, there is no conductive material between the pairs of signal traces 302 and 304 or between the pairs of traces 304 and 306, and these adjacent pairs of traces are insulated from one another exclusively by insulating material of the cable. The size of the isolation gaps (e.g., isolation gaps 308, 310) between each of the differential signal pairs is selectively tailored in proportion to a frequency of signals supported by the pairs of traces 302, 304, and 306 such that larger gaps are used in implementations supporting higher signal frequencies. This selective tailoring ensures that the insulation provided by each of the isolation gaps 308, 310 is sufficient to mitigate cross-talk between the differential signal pairs by a degree that satisfies signal quality requirements for a given product specification.

In one implementation where the FFC 300 is designed to support USB 3.0 SuperSpeed signals, the size of the isolation gaps 308, 310 is at least 3× a distance between any individual one of the traces and the nearest ground plane (e.g., 312, 314). For example, the size of the isolation gap 308 is at least 3× the distance 318 between signal trace 320 and the ground plane 314. At higher frequencies, the size of the isolation gap 308 may be as large as 5× the distance 318 between the signal trace 320 and the ground plane 314.

Sizing the isolation gaps 308, 310 in proportion to signal frequency (as described above) ensures a degree of isolation sufficient to prevent cross-talk between the adjacent differential signal pairs, thereby preserving high signal quality and increasing the practicality of using the FFC 300 at longer lengths and/or in use cases where the FFC 300 is folded.

Figure 4:
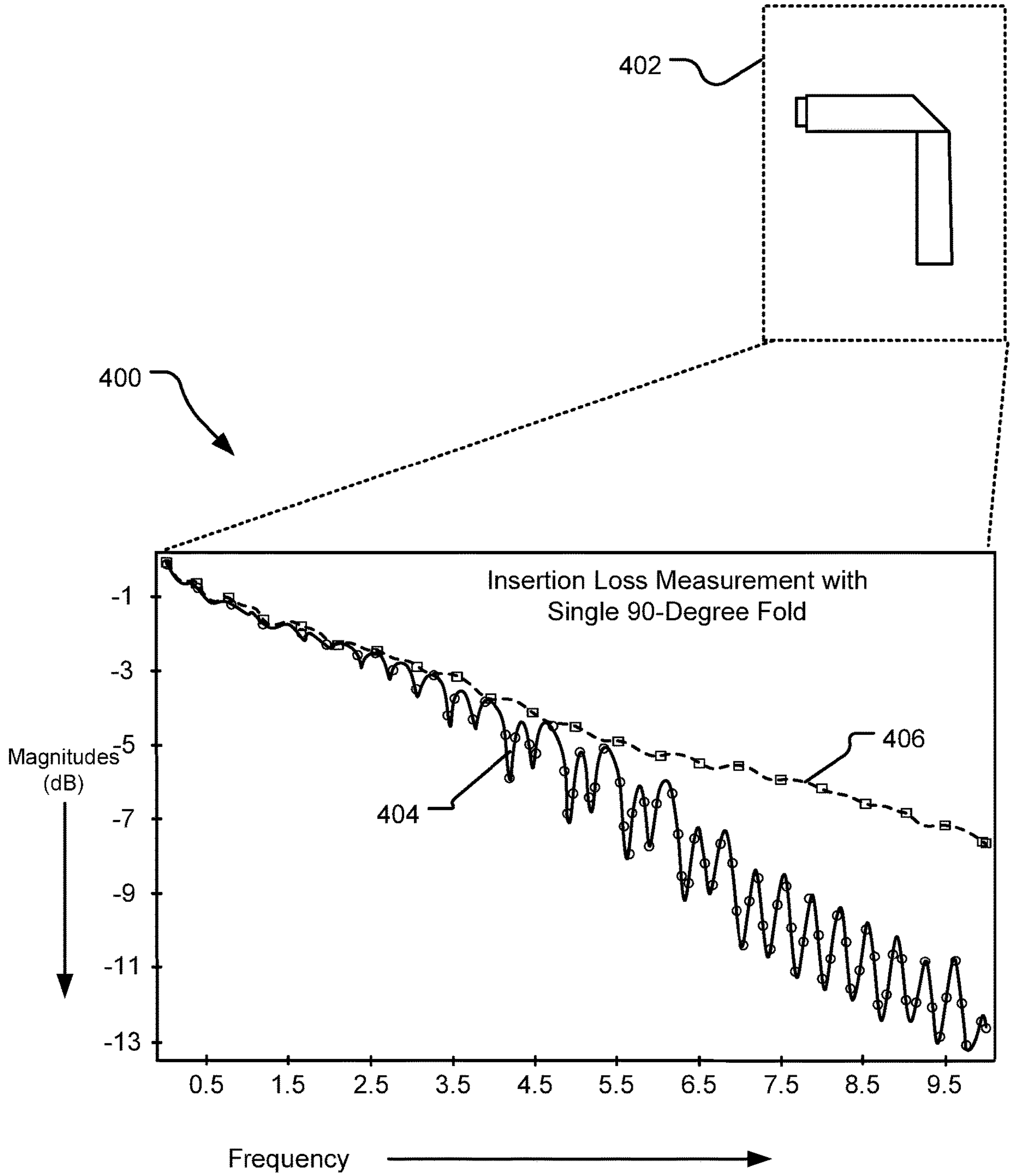
FIG. 4 includes example graph illustrating improvements in signal quality realized by the FFC discussed with respect to FIG. 3.

FIG. 4 includes an example graph 400 that illustrate improvements in signal quality realized by the FFC of FIG. 3 as compared to an FFC that incorporates the ground-signal-signal-ground layout of FIG. 2.

A first line 404 and a second line 406 on the graph 400 illustrate insertion loss measured across an FFC that is configured in an electronic device to be folded back on itself, such as in the matter shown in expanded view 402 (e.g., where an inflection point in the cable separates first and second portions that are stacked on top of one another).

The first line 404 illustrates the insertion loss realized when an FFC with the ground-signal-signal-ground layout of FIG. 2 is used in such configuration. A second line 406 illustrates the insertion loss realized when the FFC is modified to exclude the ground traces and instead include isolation gaps between the differential signal pairs (e.g., as in the FFC of FIG. 3). Due to the absence of crosstalk between the differential signal pairs in the latter scenario, signal quality is improved. These improvements scale in proportion to signal frequency, making the FFC well suited for supporting high-frequency signals.

Figure 5:
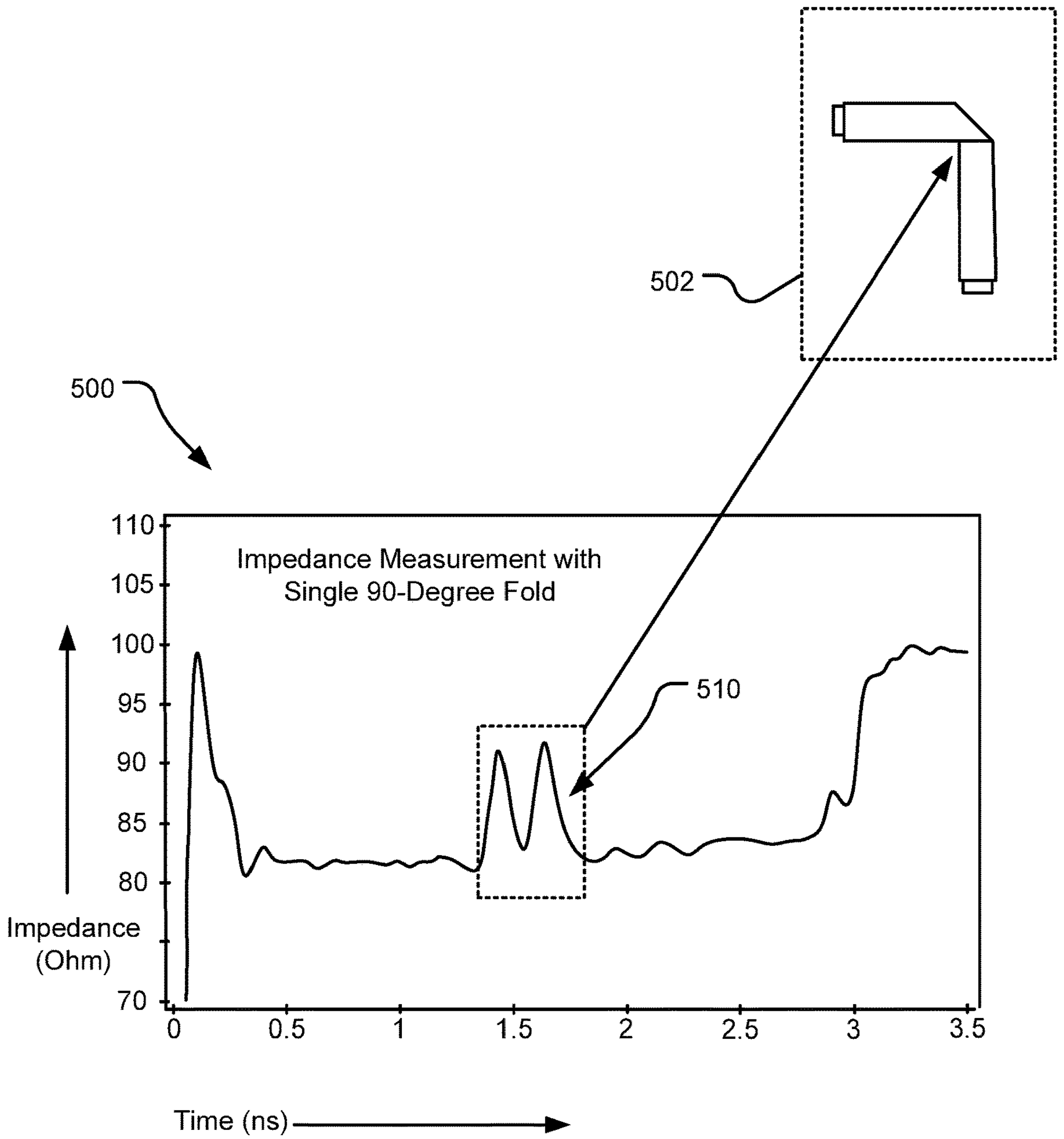
FIG. 5 illustrates an example graph illustrating an impedance discontinuity that occurs when an FFC is arranged to assume a non-linear path with a fold that causes adjacent portions of the FFC to stack relative to one another.

FIG. 5 illustrates an example graph 500 illustrating an impedance discontinuity that occurs when an FFC is arranged to assume a non-linear path with a fold that causes adjacent portions of the FFC to stack relative to one another. For example, the non-linear path includes a fold with a single right-angle bend, as shown in expanded view 502. As shown in the graph 500, an impedance discontinuity 510 is observed in the middle of the cable at the fold.

Figure 6:
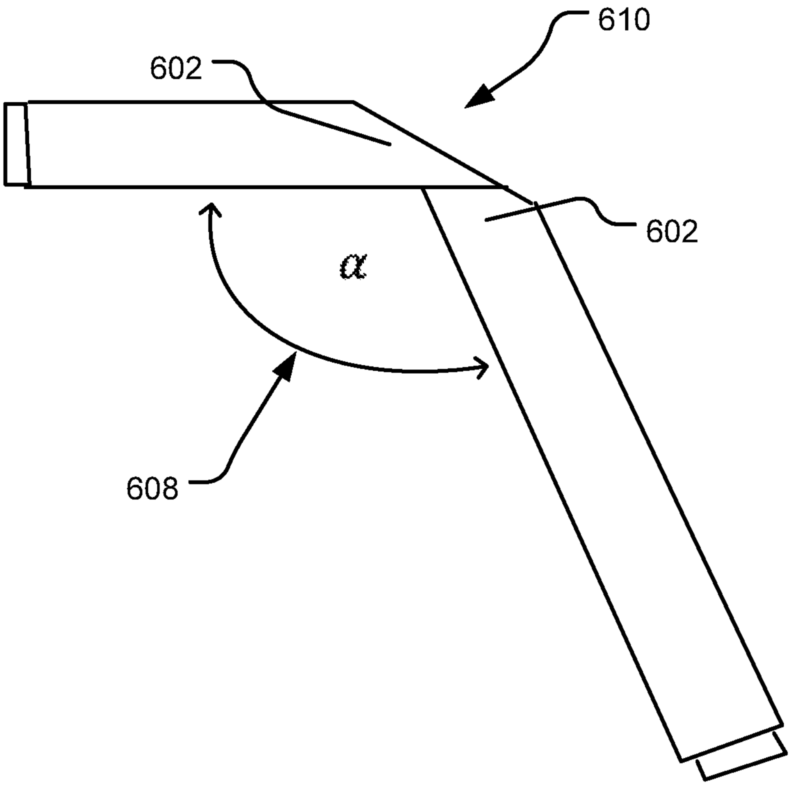
FIG. 6 illustrates an FFC that has been folded to create an obtuse angle.

It has been found, however, that varying the degree of the fold angle can reduce the magnitude of the impedance discontinuity 510. FIG. 6 illustrates this technique.

Specifically, FIG. 6 illustrates an FFC 600 that has been folded (at fold 610) to create an obtuse angle 608 (*a*). Like other implementations described herein, the fold in the FFC 600 has the effect of vertically stacking a first portion 602 of the FFC 600 and a second portion 604 on top of one another in the region proximal to the fold 610. As shown in FIG. 5, folding the FFC 600 creates a discontinuity in the signal impedance. Notably, however, folding the FFC 600 at an obtuse angle (e.g., as shown in FIG. 6) reduces the magnitude of the impedance discontinuity as compared to folding the FFC at a right angle.

Figure 7:
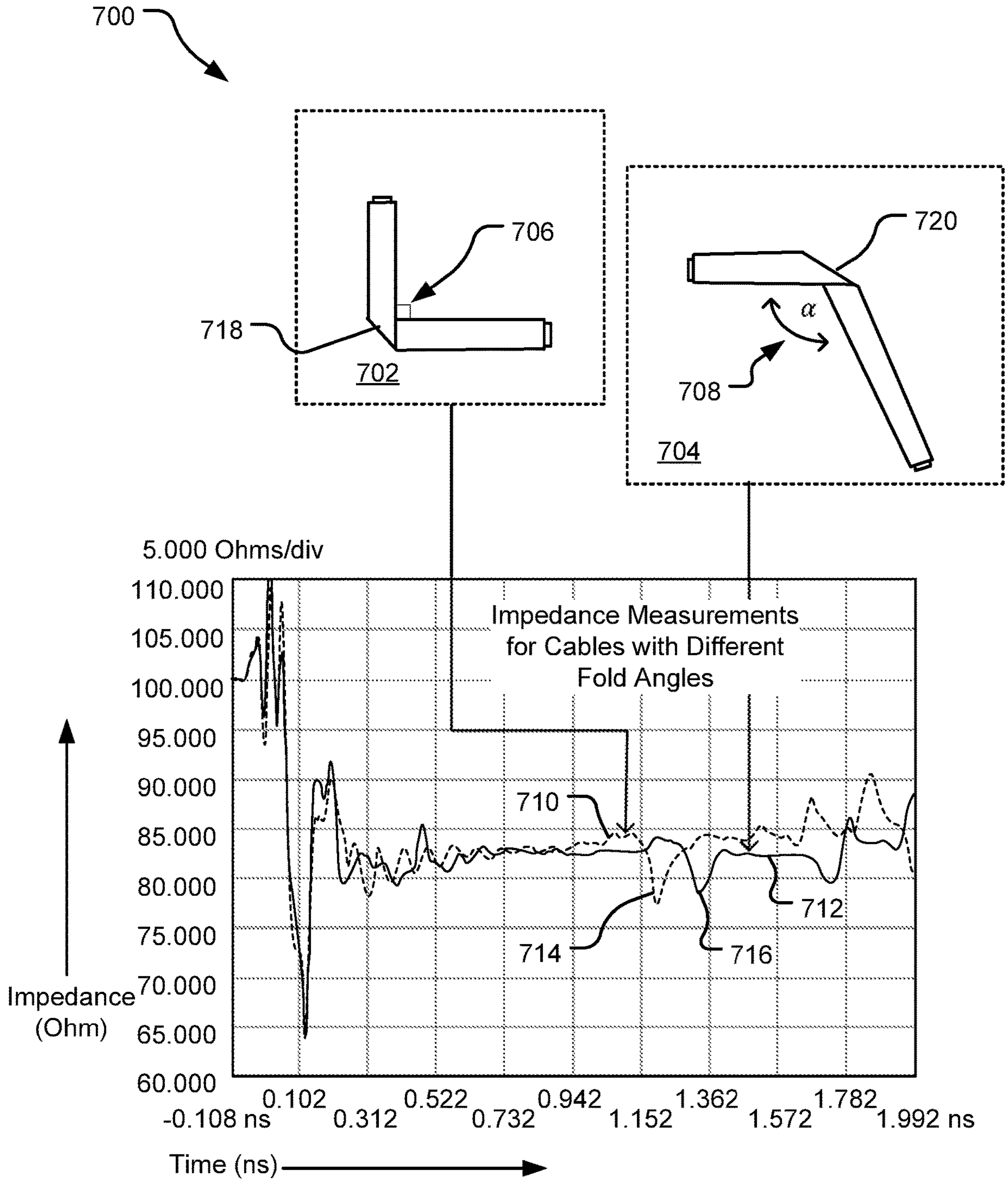
FIG. 7 illustrates a graph illustrating an effect of including multiple folds of different angular magnitudes in an FFC used to transmit high-speed signals.

FIG. 7 illustrates a graph 700 illustrating an effect of including folds of different angular magnitudes in an FFC used to transmit high-speed signals (e.g., USB 3.0 Superspeed). In particular, the graph 700 illustrates signal impedance measured in two different cables with identical characteristics except for the magnitude a fold angle. A first FFC 702 has a fold 718 that forms a 90 degree angle 706 while a second FFC 704 has a fold 720 that forms an obtuse angle 708. In the specific example shown in relation to the graph 700, the fold 720 forms a 121 degree angle. In one implementation, both of the first and second FFCs 702, 704 have features consistent with the cable shown in FIG. 3.

In the graph 700, a first line 710 illustrates signal impedance measured in a signal received along the first FFC 702. A second line 712 illustrates signal impedance measured in a signal received along the second FFC 704. At the fold 718, a first impedance discontinuity 714 is observed. At the fold 720, a second impedance discontinuity 716 is observed. Notably, the impedance discontinuity 714 in the first FFC 702 is larger in magnitude than the second impedance discontinuity 716 in the second FFC 704. Thus, the technique of folding an FFC at an obtuse angle (e.g., as in the angle 708) rather than at a right angle (e.g., as in the angle 706) has the effect of improving signal quality. In general, the larger the angle of the fold, the smaller the impedance discontinuity observed. Therefore, there are performance benefits to be realized by designing FFC paths to (1) mitigate the total number of folds and/or (2) implement obtuse angle folds instead of right-angle folds.

Figure 8:
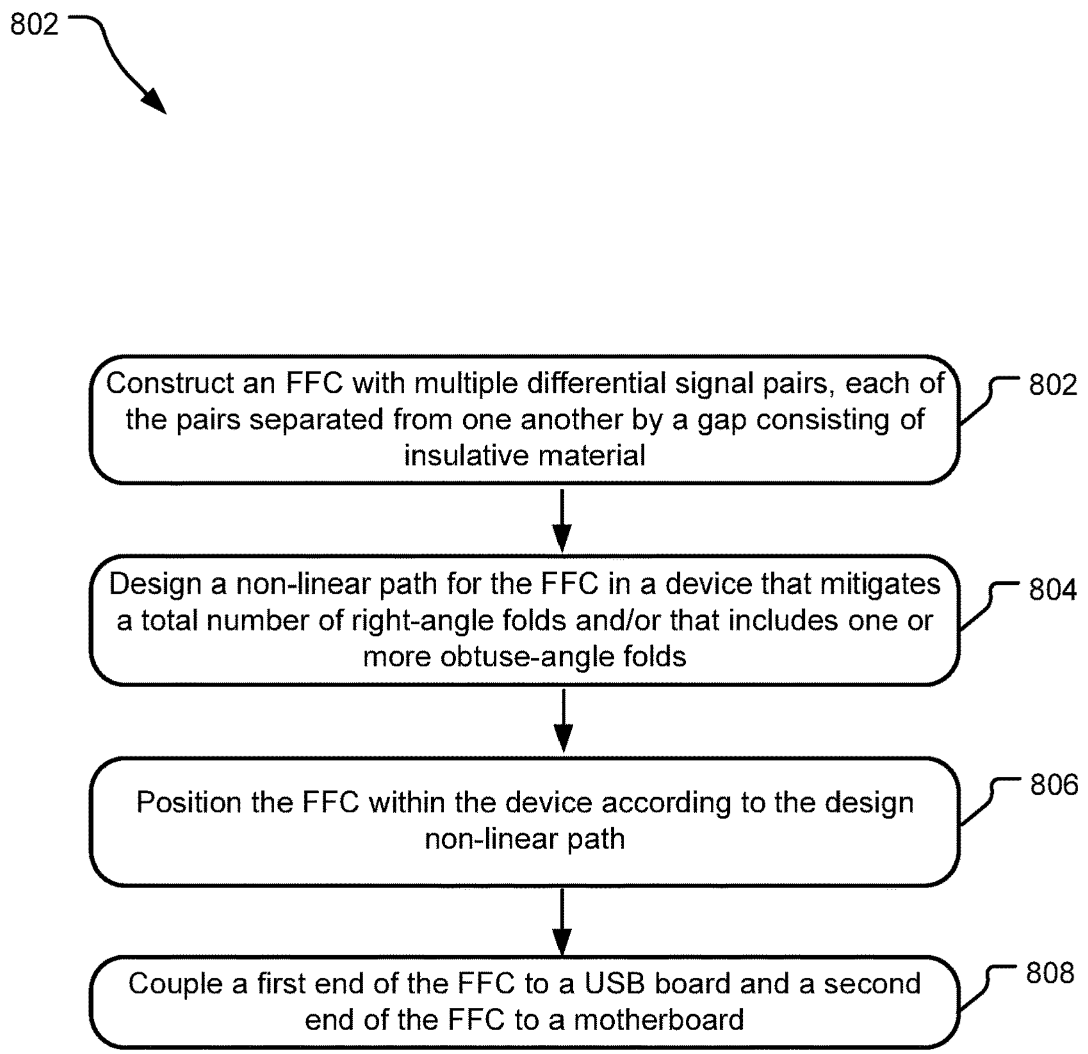
FIG. 8 illustrates example operations for implementing a high-speed interface using an FFC that is arranged to assume a non-linear path within an electronic device.

FIG. 8 illustrates example operations 800 for implementing a high-speed interface using an FFC that is arranged to assume a non-linear path within an electronic device. A construction operation 802 constructs an FFC with multiple differential signal pairs that are each separated from one another by a gap consisting of insulating material. The gaps between each adjacent differential signal pair do not include conductive material (e.g., there is no conductive trace running along the length of the FFC between the pairs of differential signal traces). In one implementation, the FFC including these features is configured to receive and transmit USB 3.0 Superspeed signals. Utilizing an FFC that lacks conductive material in the regions between differential signal pairs has the effect of substantially mitigating or preventing crosstalk that may otherwise occur proximal to folds in the FFC.

A path design operation 804 designs a non-linear path for the FFC to assume within an electronic device. According to one implementation, the non-linear path is designed to mitigate a total number of folds in the FFC and/or mitigate the total number of right-angle folds by utilizing one or more obtuse-angle folds instead of one or more right-angle folds.

A first assembly operation 806 positions the FFC within the device according to the designed non-linear path. A second assembly operation 808 couples a first end of the FFC to a USB board and a second end of the FFC to a motherboard such that the FFC supports bilateral communications between a main CPU of the motherboard and a USB controller (e.g., microprocessor) of the USB board. A transmission operation 810 transmit high-speed signals along the non-linear path between the two processing components.

Figure 9:
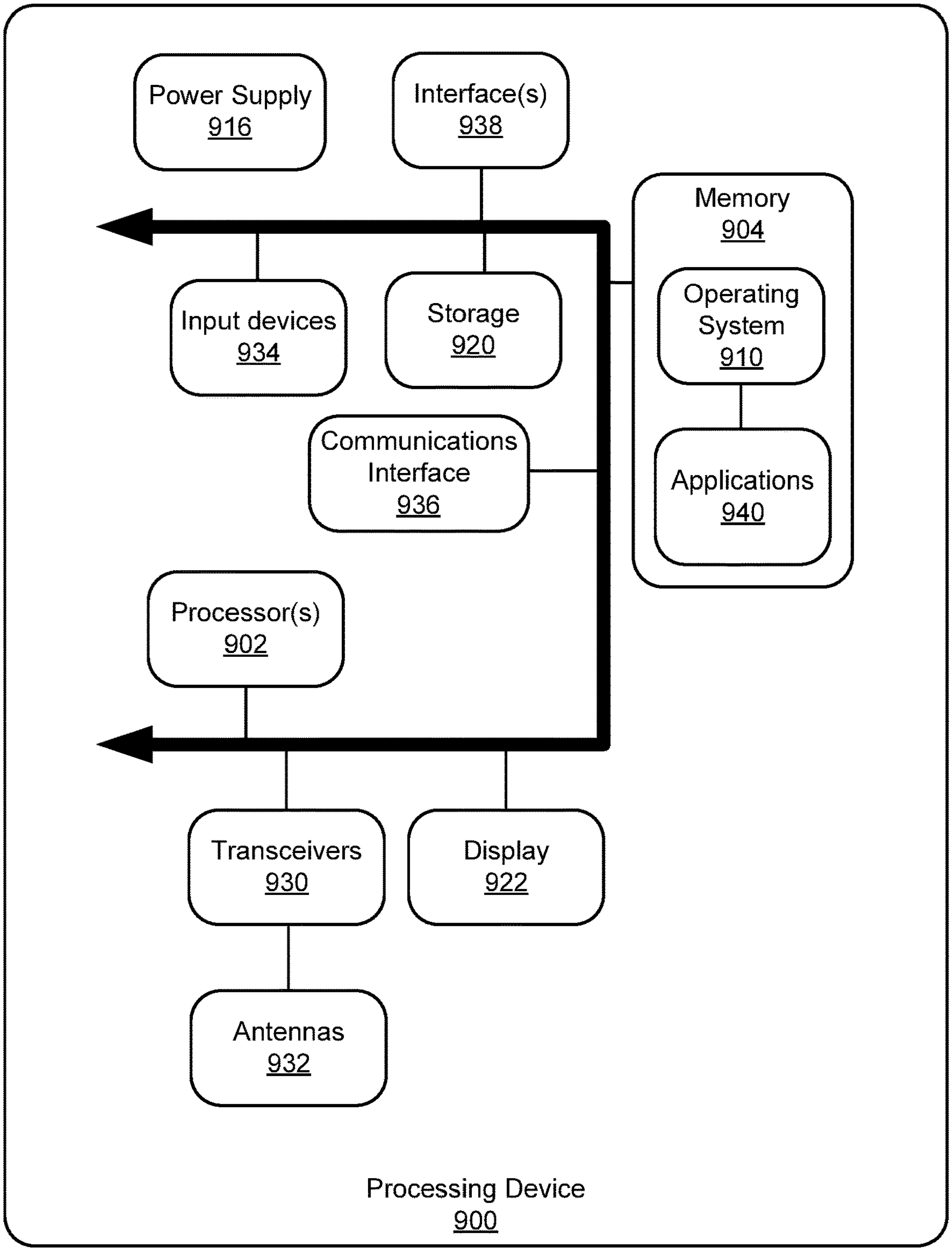
FIG. 9 illustrates an example processing device suitable for implementing aspects of the disclosed technology.

FIG. 9 illustrates an example schematic of a processing device 900 that may be suitable for implementing aspects of the disclosed technology. The processing device 900 includes processors 902 (e.g., a CPU and a USB controller controller), memory 904, a display 922, and other interfaces 938 (e.g., buttons). The memory 904 generally includes both volatile memory (e.g., RAM) and non-volatile memory (e.g., flash memory). An operating system 910, such as the Microsoft Windows® operating system, the Microsoft Windows® Phone operating system or a specific operating system designed for a gaming device, resides in the memory 904 and is executed by the processor(s) 902, although it should be understood that other operating systems may be employed.

One or more applications 940 are loaded in the memory 904 and executed on the operating system 910 by one or more of the processors 902. Applications 940 may receive input from various input local devices (not shown) such as a microphone, keypad, mouse, stylus, touchpad, joystick, etc. Additionally, the applications 940 may receive input from one or more remote devices, such as remotely-located smart devices, by communicating with such devices over a wired or wireless network using more communication transceivers 930 and an antenna 932 to provide network connectivity (e.g., a mobile phone network, Wi-Fi®, Bluetooth®). The processing device 900 further includes storage 920 and a power supply 916, which is powered by one or more batteries and/or other power sources and which provides power to other components of the processing device 900. The power supply 916 may also be connected to an external power source (not shown) that overrides or recharges the built-in batteries or other power sources.

The processing device 900 may include a variety of tangible computer-readable storage media and intangible computer-readable communication signals. Tangible computer-readable storage can be embodied by any available media that can be accessed by the processing device 900 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 900. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a flat flexible cable (FFC) configured to facilitate bilateral communications between processors. The FFC includes at least two differential signal pairs arranged directly adjacent to one another on opposite sides of an isolation gap that consists of non-conductive material.

In an example system of any preceding system, the FFC is configured to receive and transmit signals of USB protocol.

In another example system of any preceding system the FFC further comprises three differential signal pairs and a distance between each adjacent pair of the three pairs is defined by an isolation gap consisting of the non-conductive material.

In still yet another example system of any preceding system, the FFC is configured to receive and transmit both USB 3.0 SuperSpeed signals and USB 2.0 high-speed signals.

In another example system of any preceding system, the FFC is positioned to assume a non-linear path within a device enclosure. The non-linear path includes at least one fold that stacks first and second portions of the FFC on top of one another.

In another example system of any preceding system, the fold creates an obtuse angle.

In another example system of any preceding system, the FFC has a first end coupled to a processor on a motherboard and a second end coupled to a USB card.

An example method disclosed herein provides for constructing a flat flexible cable (FFC) configured to facilitate bilateral communications between processors. The FFC includes at least two differential signal pairs arranged directly adjacent to one another on opposite sides of an isolation gap consisting of non-conductive material.

In yet another example method of any preceding method, the non-conductive material and the differential signal pairs are encased within a ground plane and the isolation gap has a size greater than about three times a minimum distance between the ground plane and a trace of the differential signal pairs.

In another example method of any preceding method, the FFC is configured to receive and transmit signals of USB protocol.

In still another example method of any preceding method, the FFC is configured to receive and transmit both USB 3.0 SuperSpeed signals and USB 2.0 high-speed signals.

In still another example method of any preceding method, the method further comprises designing a non-linear path for the FFC to assume within an electronic device enclosure, where the non-linear path includes at least one fold that stacks first and second portions of the FFC on top of one another.

In still another example method of any preceding method, designing the non-linear path include designing the non-linear path to include a minimal number of right-angle folds in the FFC.

In yet still another example method of any preceding method, the at least one fold forms an obtuse angle.

An example electronic device disclosed herein includes a motherboard including a first processor, a daughterboard including a second processor, and a flat flexible cable (FFC) arranged to assume in a non-linear path within the electronic device and to facilitate bilateral communications between the first processor and the second processor. The FFC includes at least two differential signal pairs arranged directly adjacent to one another on opposite sides of an isolation gap, and the isolation gap consists of non-conductive material.

In an example electronic device of any preceding electronic device, the non-linear path includes at least one fold that stacks first and second portions of the FFC on top of one another.

In still another example electronic device of any preceding electronic device the at least one fold forms an obtuse angle.

In another example electronic device of any preceding electronic device, the FFC is configured to receive and transmit USB 3.0 SuperSpeed signals.

In still another example electronic device of any preceding electronic device, the non-conductive material and the differential signal pairs are encased within a ground plane and the isolation gap has a size greater than about three times a minimum distance between the ground plane and a trace of the differential signal pairs.

In yet another example electronic device of any preceding electronic device, the FFC is configured to receive and transmit both USB 3.0 SuperSpeed signals and USB 2.0 high-speed signals.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:

a flat flexible cable (FFC) configured to facilitate bilateral communications between processors, the FFC including at least two differential signal pairs arranged directly adjacent to one another on opposite sides of an isolation gap, the isolation gap consisting of non-conductive material.

2. The system of claim 1, wherein the FFC is configured to receive and transmit signals of USB protocol.

3. The system of claim 1, wherein the FFC further comprises three differential signal pairs and a distance between each adjacent pair of the three pairs is defined by an isolation gap consisting of the non-conductive material.

4. The system of claim 1, wherein the FFC is configured to receive and transmit both USB 3.0 SuperSpeed signals and USB 2.0 high-speed signals.

5. The system of claim 1, wherein the FFC has a first end coupled to a processor on a motherboard and a second end coupled to a USB card.

6. The system of claim 1, wherein the FFC is positioned to assume a non-linear path within a device enclosure, the non-linear path including at least one fold that stacks first and second portions of the FFC on top of one another.

7. The system of claim 6, wherein the fold creates an obtuse angle.

8. A method comprising:

constructing a flat flexible cable (FFC) configured to facilitate bilateral communications between processors, the FFC including at least two differential signal pairs arranged directly adjacent to one another on opposite sides of an isolation gap, the isolation gap consisting of non-conductive material.

9. The method of claim 8, wherein the non-conductive material and the differential signal pairs are encased within a ground plane and the isolation gap has a size greater than about three times a minimum distance between the ground plane and a trace of the differential signal pairs.

10. The method of claim 8, wherein the FFC is configured to receive and transmit signals of USB protocol.

11. The method of claim 8, wherein the FFC is configured to receive and transmit both USB 3.0 SuperSpeed signals and USB 2.0 high-speed signals.

12. The method of claim 8, further comprising:

designing a non-linear path for the FFC to assume within an electronic device enclosure, the non-linear path including at least one fold that stacks first and second portions of the FFC on top of one another.

13. The method of claim 12, wherein designing the non-linear path further comprises:

designing the non-linear path to include a minimal number of right-angle folds in the FFC.

14. The method of claim 12, wherein the fold forms an obtuse angle.

15. An electronic device including:

a motherboard including a first processor;

a daughterboard including a second processor;

a flat flexible cable (FFC) arranged to assume in a non-linear path within the electronic device and to facilitate bilateral communications between the first processor and the second processor, the FFC including at least two differential signal pairs arranged directly adjacent to one another on opposite sides of an isolation gap, the isolation gap consisting of non-conductive material.

16. The electronic device of claim 15, wherein the FFC is configured to receive and transmit USB 3.0 SuperSpeed signals.

17. The electronic device of claim 15, the non-conductive material and the differential signal pairs are encased within a ground plane and the isolation gap has a size greater than about three times a minimum distance between the ground plane and a trace of the differential signal pairs.

18. The electronic device of claim 15, wherein the FFC is configured to receive and transmit both USB 3.0 SuperSpeed signals and USB 2.0 high-speed signals.

19. The electronic device of claim 15, wherein the non-linear path includes at least one fold that stacks first and second portions of the FFC on top of one another.

20. The electronic device of claim 19, wherein the at least one fold forms an obtuse angle.

* * * * *